United States Patent
Kim et al.

[11] Patent Number: 6,057,056
[45] Date of Patent: May 2, 2000

[54] COMPOSITE ELECTRODE AND SECONDARY BATTERY THEREFROM

[75] Inventors: Hyun Jung Kim, Kimhae; Hyun Kyung Sung; Kwanyoung Lee, both of Taejeon, all of Rep. of Korea

[73] Assignee: Korea Kumho Petrochemical Co., Ltd., Seoul, Rep. of Korea

[21] Appl. No.: 09/058,149

[22] Filed: Apr. 10, 1998

[30] Foreign Application Priority Data

| Apr. 22, 1997 | [KR] | Rep. of Korea | 97-14883 |
| Aug. 27, 1997 | [KR] | Rep. of Korea | 97-41365 |
| Sep. 12, 1997 | [KR] | Rep. of Korea | 97-47046 |

[51] Int. Cl.[7] .................................................. H01M 4/60
[52] U.S. Cl. ................................. 429/213; 429/245
[58] Field of Search ...................... 429/213, 245

[56] References Cited

U.S. PATENT DOCUMENTS

| 4,833,048 | 5/1989 | Dejonghe et al. | 429/104 |
| 5,324,599 | 6/1994 | Oyama et al. | 429/192 |
| 5,413,882 | 5/1995 | Uemachi et al. | 429/213 |
| 5,460,905 | 10/1995 | Skotheim | 429/213 |
| 5,516,598 | 5/1996 | Visco et al. | 429/42 |
| 5,571,292 | 11/1996 | Sotomura | 29/623.5 |
| 5,665,492 | 9/1997 | Sotomura | 429/213 |

FOREIGN PATENT DOCUMENTS

0797264  9/1997  European Pat. Off. .

OTHER PUBLICATIONS

D. Linden Ed., Handbook of Batteries and Fuel Cells, 1984, McGraw–Hill, p. C–3 (No month).

Nature, vol. 373, 1995, p. 598 (No month).

*Primary Examiner*—Carol Chaney
*Attorney, Agent, or Firm*—Jacobson, Price, Holman & Stern, PLLC

[57] ABSTRACT

The present invention relates to an improved secondary battery having high weight energy density and good reversibility, more specifically, a battery containing i) a positive electrode comprising a reversible positive electrode material containing an organosulfur compound wherein sulfur—sulfur bond is formed upon oxidation and sulfur—sulfur bond is cleaved upon electrolytic reduction, a metallic compound, and a current collector containing copper metal; ii) a polymer electrolyte having lithium salt; and iii) a negative electrode made of lithium metal, lithium alloy or lithium intercalating carbon.

7 Claims, 8 Drawing Sheets

COMPOSITE ELECTRODE AND SECONDARY BATTERY THEREFROM

BACKGROUND OF THE INVENTION

1. Field of the Invention

The present invention relates to an electrode having high capacity and good reversibility, and a secondary battery comprising i) a positive electrode comprising an organosulfur compound which is capable of reversible formation of S—S bond upon oxidation and a metallic compound selected from transition metals, and a current collector containing copper metal; ii) a polymer electrolyte having lithium salt; and iii) a negative electrode made of lithium metal, lithium alloy or lithium intercalation compounds.

2. Description of Prior Art

Batteries have a wide spectrum of applications as key component, of modern portable electronic devices. Especially, secondary batteries are essential to the development of hand-carrying devices such as cellular telecommunication tools and notebook computers. A series of development of nickel-cadmium, nickel-metal hydride, and lithium ion types have provided advantages in reducing the size and weight of secondary batteries. However, the rapid advancement of electronic technology and the widespread use of mobile devices has been continuously demanding a next generation battery which has higher capacity than existing systems.

The secondary battery using organosulfur compound as a positive electrode material has been disclosed in U.S. Pat. No. 4,833,048. In this patent, an S—S bond of organic disulfide compound consisting of positive electrode is cleaved by electrolytic reduction to form organic thiolate and organic disulfide is reformed by electrolytic oxidation of organic thiolate. Especially, in case of two or more thiolate groups present in a molecule, polymeric form of organic disulfide is formed. The redox couple of organic disulfide and organic thiolate accounts for theoretical energy density of 350 to 800 Wh/kg in combination with metal negative electrode. A rechargeable metal-sulfur battery described in the invention provides practically higher energy density of 150 Wh/kg than conventional secondary battery.

To increase the practical capacity of organic disulfide electrode, U.S. Pat. No. 5,324,599 suggested the addition of $\pi$ electron conjugated conductive polymer like polyaniline to cathodic composition containing organic disulfide. According to the report of same inventors disclosed in *Nature*, 373, 598(1995), the electron transfer of organic disulfide was catalytically accelerated in the presence of polyaniline. Accordingly, the composite electrode from organic disulfide and polyaniline mixed together in molecular level shows the enhanced energy density in excess of 600 Wh/kg when coupled with lithium metal as negative electrode. However, in order to maintain the high energy density, the cell required high charging voltage up to 4.75 V, which is too high to ensure the electrochemical stability of cell components such as polymeric electrolyte and other organic parts. Lower charging potential which is practically required results in the decline of energy density of the cell.

In order to increase the cycle life of organic disulfide electrode, approaches to immobilize organic disulfide have been made since diffusive loss of soluble form of organic disulfide, such as mercaptan or thiolate, eventually results in the decrease of capacity over the repeated cycle of charge and discharge. Addition of metal such as copper, or silver to bind organic disulfide species was diclosed in U.S. Pat. 5,665,492. Addition of copper ion to organic disulfide and use of the resulted complex was described in Eur. Pat. No. 799,264, A2. Improvement of cycle life was also suggested in U.S. Pat. No. 5,516,598, when metal salt of broad range of multivalent metallic complex of organic disulfide was used. In these disclosures, the role of metal as a coordinating center of sulfur containing ligand were suggested to improve the cycle life of organic disulfide electrode, but functions of metal such as redox reaction and activation of sulfur containing compound were not described. Consequently, above mentioned approaches provide only limited level of energy densities which is at maximum the sole capability of organic disulfide.

Accordingly, the improvement for enhancing capacity and extended cycle life has yet to be realized to the secondary battery employing organosulfur compound as positive electrode material.

SUMMARY OF THE INVENTION

An object of the present invention is to provide a positive electrode with high capacity and good reversibility comprising 1) a positive electrode material comprising;
   i) an organosulfur compound which is capable of forming sulfur—sulfur bond by electrolytic oxidation and reversibly regenerated by reductive cleavage of sulfur—sulfur bond;
   ii) one or more metallic components selected from the group consisting of transition metals, their alloys, their ionic salts, and combinations thereof; and
   iii) one or more electrically conductive ingredients selected from the group consisting of conductive carbon and electrically conductive polymer and
2) an electrically conductive current collector made of copper or copper alloy on which said positive electrode material is placed.

Preferred organosulfur compound has active functional group containing sulfur atom in which electrochemical activity is accompanied with the formation of sulfur—sulfur bond upon oxidation and the cleavage of sulfur—sulfur bond and generation of S—M bond (M is alkali metal, alkaline earth metal or transition metal and includes proton) to form mercaptan or thiolate group upon electrolytic reduction.

Preferred metallic compounds of the composite electrode of present invention are selected from the group of transition metals and their alloys, their ionic salts, and their combinations. Of the transition metals, preferred are metals having multiple oxidation states, which include scandium(Sc), titanium(Ti), vanadium(V), chromium(Cr), manganese (Mn), iron(Fe), cobalt(Co), nickel(Ni), Zinc(Zn) in the first row, molybdenum(Mo), ruthenium(Ru), rhodium(Rh) in the second row, and tungsten(W) in the third row. More preferred are chromium(Cr), manganese(Mn), iron(Fe), molybdenum(Mo), tungsten(W) and cobalt(Co) in terms of high equivalent capacity.

Another object of the present invention is to provide a positive electrode in which said positive electrode material of the present invention is coupled with conductive current collector. Preferred conductive material for current collector is made of metal or metal alloy. More preferred conductive material for current collector is copper or copper alloy.

It is still another object of the present invention to provide an improved secondary battery having high energy density and good cycle life comprising;
   i) a positive electrode selected from one of the positive electrodes described above ii) a polymer electrolyte having lithium salt; and iii) a negative electrode made of lithium metal, lithium alloy, or lithium intercalation materials selected from the group consisting of graphite, hard carbon, carbon fiber and polyacene.

DETAILED DESCRIPTION OF THE INVENTION

Figure 1:
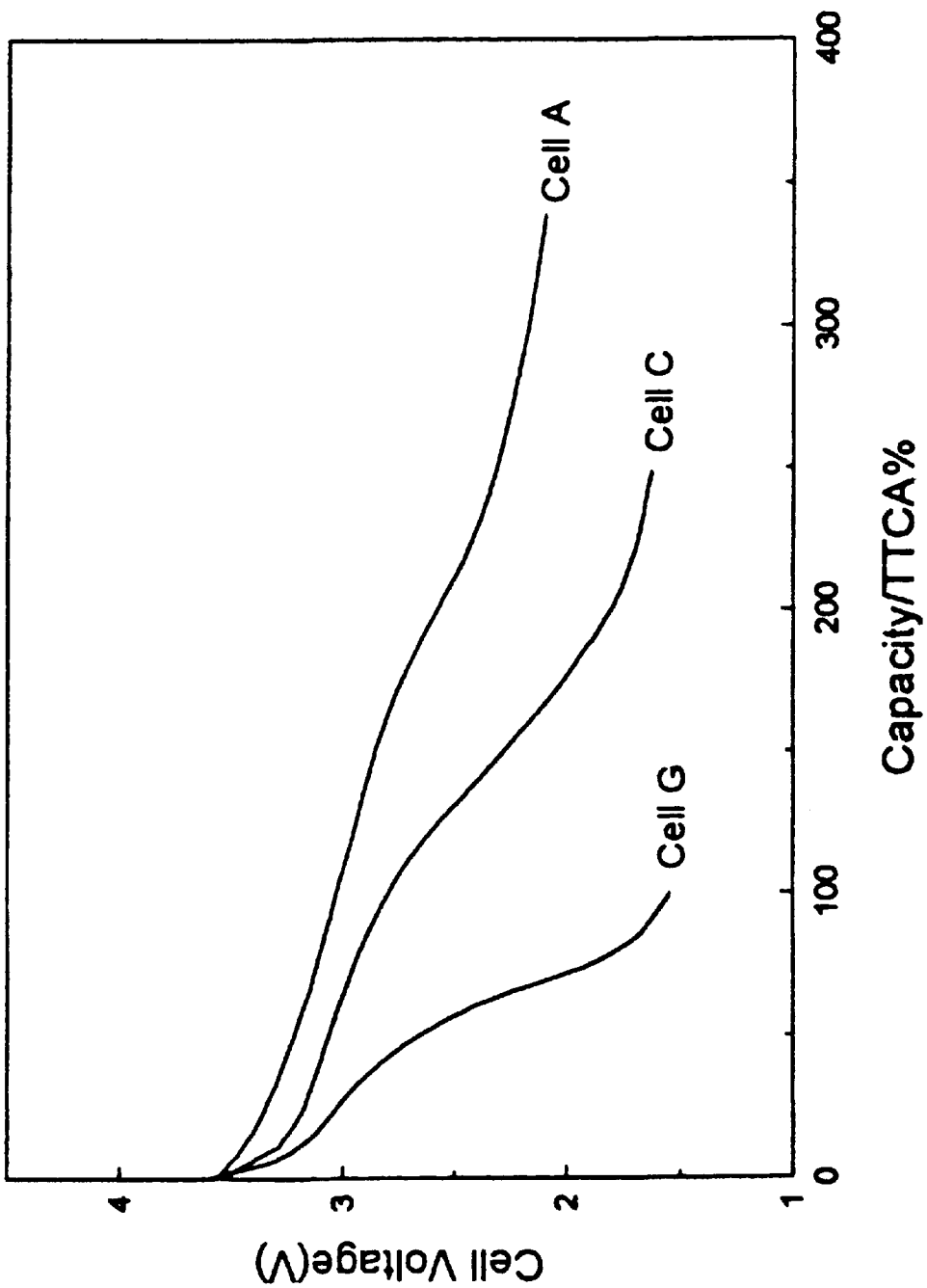
FIG. 1 compares the discharging profiles of test cells A and C which contain iron and tungsten, respectively, in positive electrode with the test cell G of which positive electrode has organosulfur active material without metallic component.

A new type of positive electrode material containing organosulfur compound and transition metal has been developed. The positive electrode of the invention is combined with a suitable negative electrode such as lithium metal, lithium alloy, or lithium intercalating compounds like carbon and a suitable polymer electrolyte to provide a secondary battery with high capacity and extended cycle life.

The composite positive electrode material of the present invention contains metallic component as an active material participating in electrode reaction in combination with organosulfur compound. When battery is charged, metal becomes metal ion by oxidation, and when battery is discharged, metal or metal ion with lower oxidation state is regenerated by reduction. Transition metals usually have multiple oxidation states and undergo more than one redox reactions. Selected metals of the invention have high equivalent capacity as enhanced by the number of electrons involved in redox chemistry. If the redox couples of metal and metal ion are utilized for electrode reaction, electrochemical equivalent capacity is as high as 2630 mAh/g for vanadium, 1550 mAh/g for chromium, 976 mAh/g for manganese, 1440 mAh/g for iron, 910 mAh/g for cobalt, and 1670 mAh/g for molybdenum (D. Linden Ed., Handbook of Batteries and Fuel Cells, McGraw-Hill, pp. C-3, 1984). Theoretical capacity is far above that of metal oxide electrodes used for conventional secondary lithium ion battery. On the other hand, the metallic component activates the electron transfer reaction of organosulfur compound coexisting in electrode so that the high capacity of organosulfur electrode can be fully utilized. Furthermore, the interaction between sulfur atom contained in organosulfur compound and metal species holds each other and prevents the loss of capacity caused by the diffusion of soluble forms of active material such as organic thiolate and metal ion into electrolyte.

Positive electrode material of the invention contains organosulfur compound which is capable of forming sulfur—sulfur bond by electrolytic oxidation and reversibly regenerated by reductive cleavage of sulfur—sulfur bond. Examples of functional groups which are capable of forming sulfur—sulfur bond includes mercaptan, thiolate, thioacid, thioester and thioketone. Formation of sulfur—sulfur bond takes place in intermolecular or intramolecular mode. Oxidation of an organosulfur compound which has a single functional group capable of forming sulfur—sulfur bond leads to formation of dimeric compound. If an organosulfur compound has two or more capable functional groups, a polymeric compound which has sulfur—sulfur linkage is generated. Regarding the organosulfur compound used for electrode material, an example include disulfide compound represented by the formula of $(R(S)_y)_n$ which was disclosed in U.S. Pat. No. 4,833,048. This material can be represented by $R(SM)_y$ when reduced. In these formulas, R represents aromatic or aliphatic hydrocarbons; y is an integer from 1 to 6; and n is an integer of 2 or more. Examples of organic disulfide include 2,5-dimercapto-1,3,4-thiadiazole and trithiocyanuric acid. As another example of organic disulfide, the compound having two or more organic thiolate groups in a molecule and having capability of intramolecular formation of disulfide bond is included. An example of such compound is represented by 1,8-disulfide naphthalene as described in U.S. Pat. No. 5,324,599.

Positive electrode material of the invention contains electrically conductive ingredients such as carbon, or electrically conductive polymer. Electrically conductive carbon includes graphite and acetylene black. Among electrically conductive polymers used as conductive ingredients for electrode material, the compound having nitrogen or sulfur atom in the polymer skeleton or side chain is preferred. Interaction of nitrogen or sulfur atom in conducting polymer with other active components, organosulfur compound and metal species, helps all the active components combine each other and minimize the loss of active contents from the electrode. Further, accelerated electron transfer of organic disulfide in the presence of conducting polymer is described in *Nature*, 373, 598(1995). Examples of such conductive polymer include polyaniline, polypyrrole and polythiophene and their derivatives.

To prepare the electrode, binder material can be added. The polymer used as binder is preferably the same kind of polymer used for polymer electrolyte. However, a suitable polymer which is not ionically conductive can be also selected. In order to dissolve binder material, organic solvent, generally, aprotic solvent can be used. The metallic component is added in powder form and dispersed in the mixture of electrode material. The particle size of powder is preferably smaller than 10 μm. and the surface of metal can be activated by treating with diluted weak acid such as acetic acid. The preferred content of metallic part is 5~95 wt. % of total active components in electrode. The slurry of composite mixture is homogenized using suitable means such as magnetic stirring, mechanical stirring, sonication, or ball milling.

The well dispersed composite electrode material is pasted on the conductive current collector. Preferred condutive material consisting current collector is copper metal. According to the present invention, the capacity of positive electrode is fully utilized by using current collector containing copper metal. The current collector made of copper metal maintains the stability of each components of the battery by preventing the excess elevation of charging potential by fixing the upper limit of voltage as the oxidation potential of copper metal.

According to the invention, a secondary battery with a said positive electrode is provided. Typical structure of the cell includes a said positive electrode of the invention, polymer electrolyte, and a negative electrode from lithium metal, lithium alloy or materials capable of lithium intercalations.

Applicable polymer electrolyte used for lithium secondary battery of the present invention is ion conductive polymer electrolyte capable of solvating lithium ion and can be prepared either in a solid type or in a gel type. Polymer electrolyte essentially consists of base polymer and lithium salt. Lithium salt can be selected from the group of $LiClO_4$, $LiBF_4$, $LiPF_6$, $LiAsF_6$, $LiAsCl_6$, $LiCF_3SO_3$, $LiN(SO_2CH_3)_2$ and their combinations. Base polymer suitable for application has a functional group containing hetero atom in repeating unit and has a certain degree of chemical affinity with lithium salt. Examples include poly(ethylene oxide), poly(propylene oxide), polyacrylonitrile, poly(acrylonitrile-co-methyl acrylate), poly(vinylidene flurroide), and poly(vinylidene fluoride-co-hexafluoropropylene). The content of lithium salt in polymer electrolyte is in the range of 5~50 mol % relative to monomer unit of base polymer. In order to plasticize polymer electrolyte, organic solvent can be added. The polar organic solvent having carbonate group, for example, one or combination of more from propylene carbonate, ethylene carbonate, dimethyl carbonate, diethyl carbonate and methyl ethyl carbonate can be used. The content of plasticizer is 10~90 wt. % of polymer electrolyte.

Negative electrode, lithium metal or lithium alloy which is capable of lithium striping and plating upon charge and discharge. Another example is a group of materials which are capable of intercalations. Examples include carbon materials such as graphite, amorphous carbon, coke pitch, polyacene, etc. Upon charging the battery, lithium is intercalated into the carbon structure and lithium ion is, in turn, ejected from negative electrode when the battery is discharged.

Positive electrode of the invention provides high capacity and good reversibility, since the redox system of metal in combination with organosulfur compound is effectively utilized. Furthermore, the invention provides a rechargeable battery with light weight and high capacity, which is most advantageous in the application of portable electronic devices such as cellular phone or notebook computer. Further, since the lithium secondary battery of the present invention consists of all solid components, it dose not raise any problems relating to the use of liquid such as leakage or pressure development and can be easily fabricated in a suitable shape according to the various application purpose of battery.

The present invention can be explained more concretely by following examples. However, the scope of the present invention shall not be limited to these examples.

EXAMPLE I

Preparation of Polymer Electrolyte

A mixture of 3.0 g of poly(acrylonitrile-co-methyl acrylcite)(94:6) and 2.3 g of lithium tetrafluoroborate was added to a mixed solvent of propylene carbonate and ethylene carbonate(10.5:7.9 wt./wt.). The mixture was heated at 120~140° C. under a nitrogen atmosphere. Then, the polymer was cast on glass plate, and dried at 60~80° C. under vacuum. The ionic conductivity of resulted electrolyte film was $10^{-3}$~$10^{-4}$ S/cm by impedance measurement.

EXAMPLE II

A powdery mixture of 1.0 g of trithiocyanuric acid (TTCA), 0.6 g of iron metal powder (particle size, 1~10 μm), 0.7 g of acetylene black, and 1.6 g of polyaniline (Versicon, Allied Signal Inc.) was prepared and mixed for 1 day using ball-mill. The mixture was added to a solution of 0.4 g of poly(vinylidene fluoride) and 0.1 g of Brij 35(Aldrich) in 20 mL of N-methyl-2-pyrrolidone and again homogenized using ball-mill for three days. The resulted slurry was pasted on copper metal sheet under an argon atmosphere. The electrode was dried at 60~80° C. under vacuum and pressed under pressure of 0.1~3 ton/cm². The test cell A was prepared by combining the electrode and a negative electrode from lithium metal foil with nickel mesh current collector and gel polymer electrolyte layer.

COMPARATIVE EXAMPLE I

Test cell A' was prepared in the same manner as example II except that SUS 316 foil was used instead of copper metal sheet as a current collector of positive electrode.

EXAMPLE III

Positive electrode was prepared in the same manner as example II except that polyaniline additive was not used. Thus a powdery mixture of 1.0 g of TTCA, 0.6 g of iron metal powder (particle size, 1~10 μm) and 0.7 g of acetylene black was mixed for 1 day using ball-mill and then added to the solution of 0.4 g of poly(vinylidene fluoride) and 0.1 g of Brij 35 (Aldrich) in 20 mL of N-methyl-2-pyrrolidone. The mixture was treated to prepare the test cell B in the same manner as described in example II.

COMPARATIVE EXAMPLE II

Test cell B' was prepared according to the procedure in example III without iron metal in the positive electrode. Thus, 1.0 g of TTCA, 0.4 g of poly(vinylidene fluoride), 0.1 g of Brij35 were dissolved in 20 mL of N-methyl-2-pyrrolidone. And then, 0.7 g of acetylene black was added. The mixture was used to prepare the test cell B' in the same manner as example II.

EXAMPLE IV

To a solution of 1.0 g of TTCA, 0.4 g of poly(vinylidene fluoride), 1.6 g of polyaniline(Versicon, Allied Signal Inc.) in 20 mL of N-methyl-2-pyrrolidone were added 0.5 g of tungsten metal powder (particle size, 1~10 μm) and 0.7 g of acetylene black. The mixture was used to prepare the test cell C in the same manner as example II.

COMPARATIVE EXAMPLE III

Test cell C' was prepared in the same manner as example IV except that graphite sheet was used instead of copper metal sheet as a current collector of positive electrode.

EXAMPLE V

To a solution of 1.5 g of TTCA, 0.4 g of poly(vinylidene fluoride), 1.2 g of polyaniline(Versicon, Allied Signal Inc.) in 20 mL of N-methyl-2-pyrrolidone were added 0.5 g of molybdenum metal powder (particle size, 1~10 μm), 0.3 g of acetylene black and 0.5 g of graphite. The mixture was used to prepare the test cell D in the same manner as example II.

COMPARATIVE EXAMPLE IV

Test cell D' was prepared in the same manner as example V except that titanium metal foil was used instead of copper metal sheet as a current collector of positive electrode.

EXAMPLE VI

To a solution of 1.5 g of TTCA, 0.4 g of poly(vinylidene fluoride), 1.6 g of polyaniline(Versicon, Allied Signal Inc.) in 20 mL of N-methyl-2-pyrrolidone were added 0.6 g of chromium metal powder (particle size, 1~10 μm), 0.7 g of acetylene black and 0.1 g of Brij 35(Aldrich). The resulted mixture was used to prepare the test cell E in the same manner as example II.

COMPARATIVE EXAMPLE V

Test cell E' was prepared in the same manner as example VI except that graphite sheet was used instead of copper metal sheet as a current collector of positive electrode.

EXAMPLE VII

To a solution of 1.5 g of TTCA, 0.4 g of poly(vinylidene fluoride), 1.6 g of polyaniline(Versicon, Allied Signal Inc.) in 20 mL of N-methyl-2-pyrrolidone were added 0.6 g of cobalt metal powder (particle size, 1~10 μm), 0.7 g of acetylene black and 0.1 g of Brij 35(Aldrich). The resulted mixture was used to prepare the test cell F in the same manner as example II.

COMPARATIVE EXAMPLE VI

Test cell F' was prepared in the same manner as example VII except that graphite sheet was used instead of copper metal sheet as a current collector of positive electrode.

COMPARATIVE EXAMPLE VII

Test cell G was prepared without metallic additive in the positive electrode. Thus, 1.0 g of TTCA, 0.4 g of poly (vinylidene fluoride), 1.6 g of polyaniline(Versicon, Allied Signal Inc.), 0.1 g of Brij35 were dissolved in 20 mL of N-methyl-2-pyrrolidone. And then, 0.7 g of acetylene black was added. The mixture was used to prepare the test cell G in the same manner as example II.

Evaluation of the Test Cells

Figure 2:
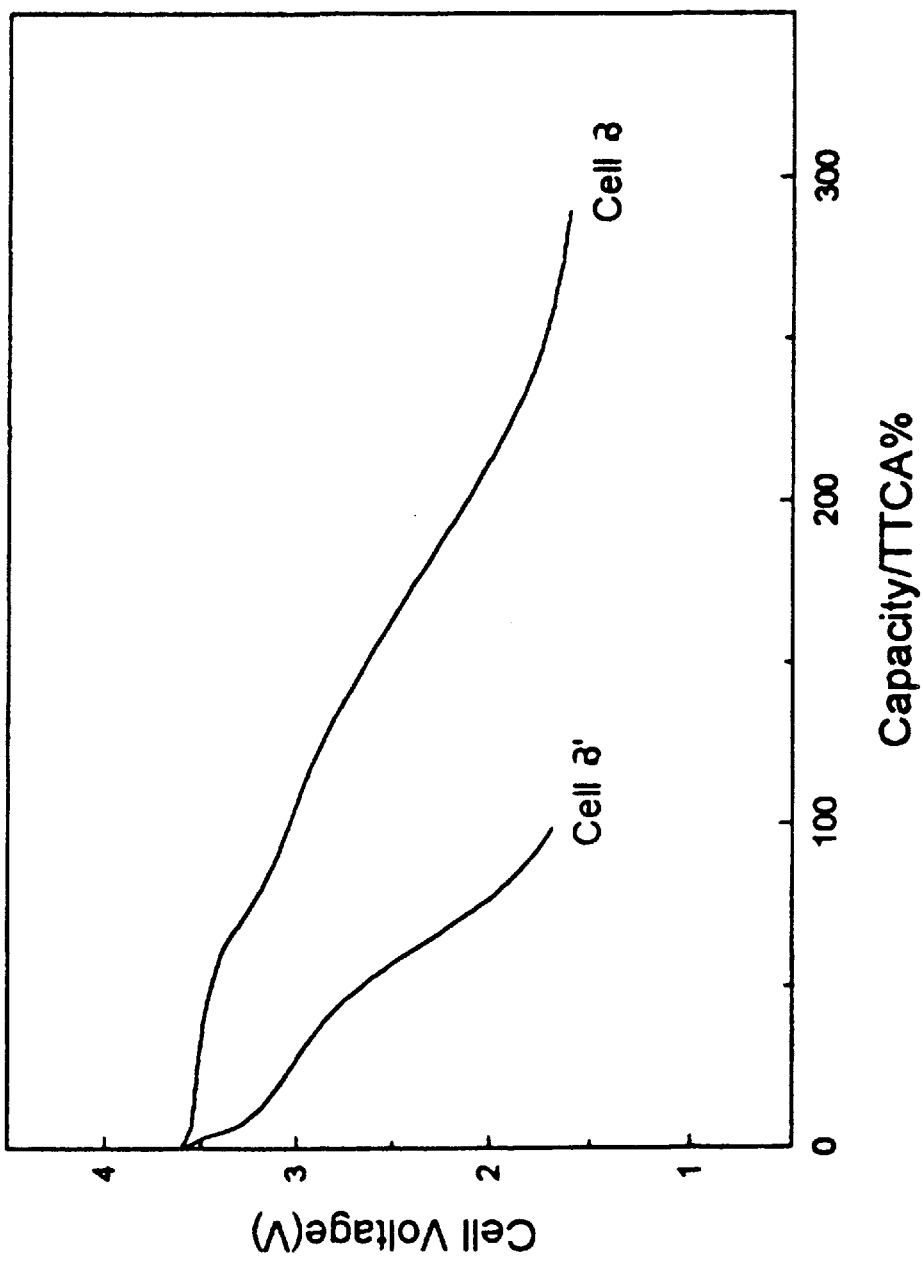
FIG. 2 shows the comparison of discharging profiles of test cell B which has iron in addition to organosulfur active material in positive electrode and test cell B' prepared without metallic component in positive electrode.
Figure 3:
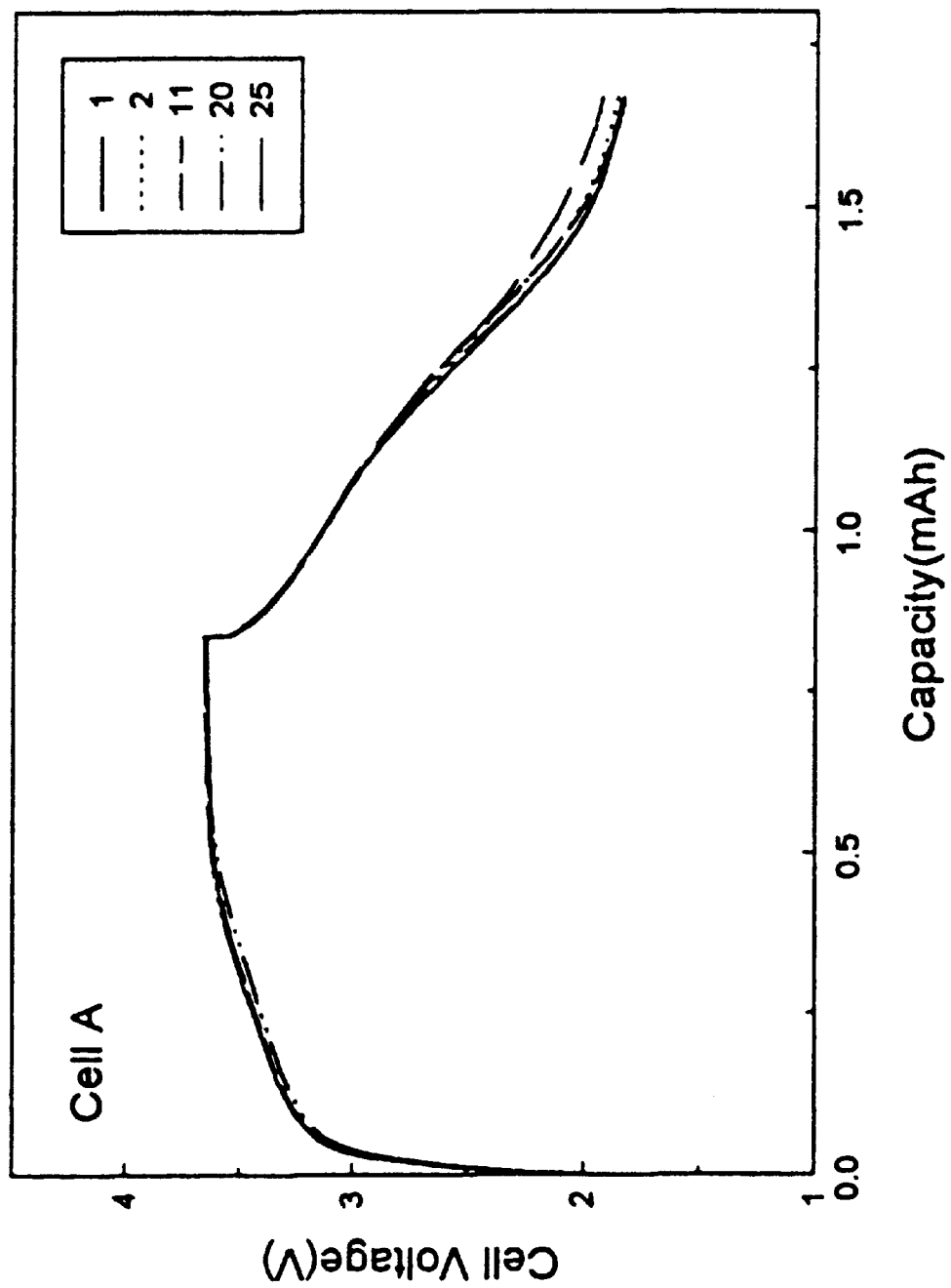
FIG. 3 shows multiple overlay of the charge-discharge profiles of test cell A according to the number of cycle.
Figure 4:
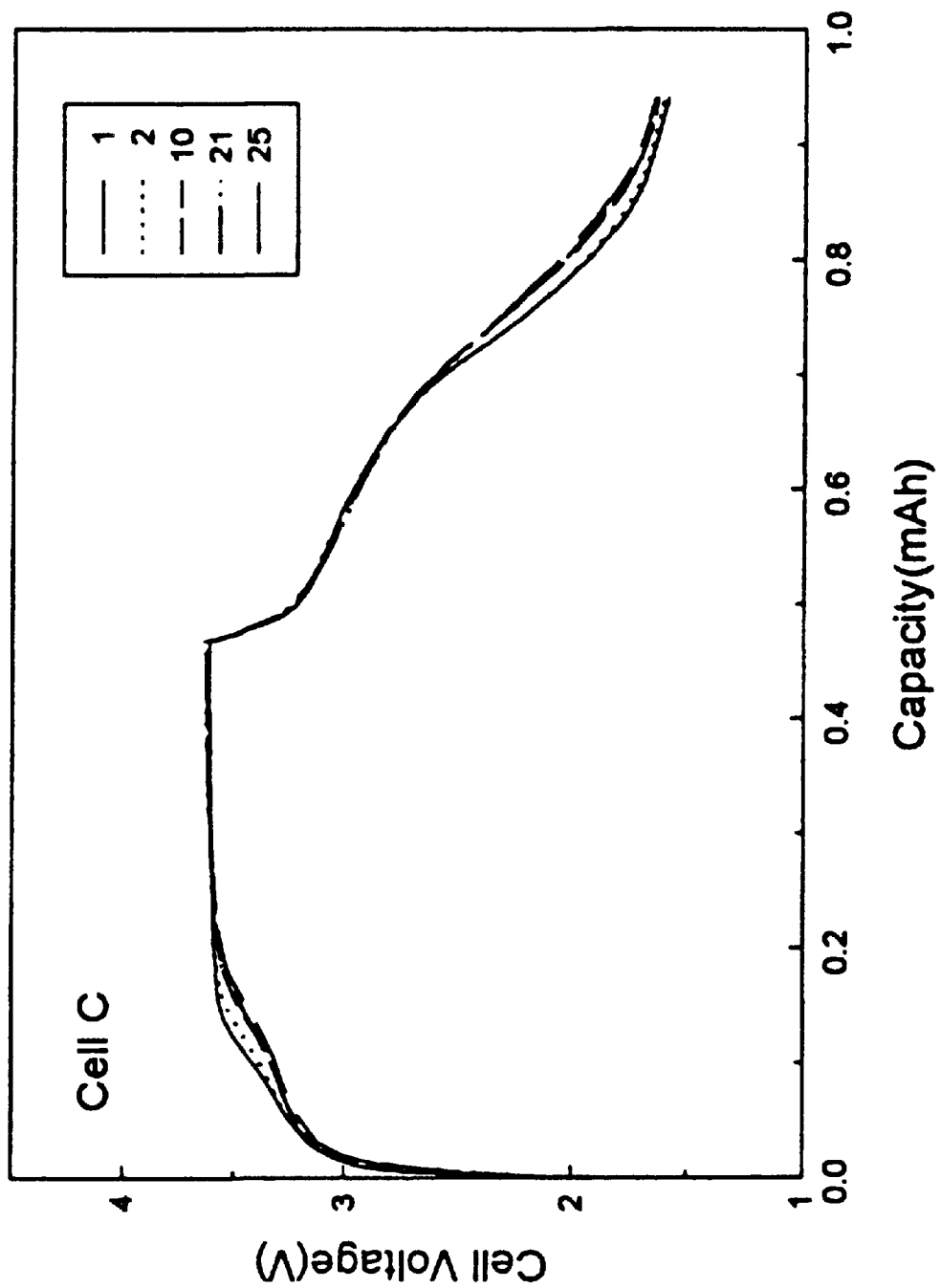
FIG. 4 shows multiple overlay of the charge-discharge profiles of test cell C according to the number of cycle.
Figure 5:
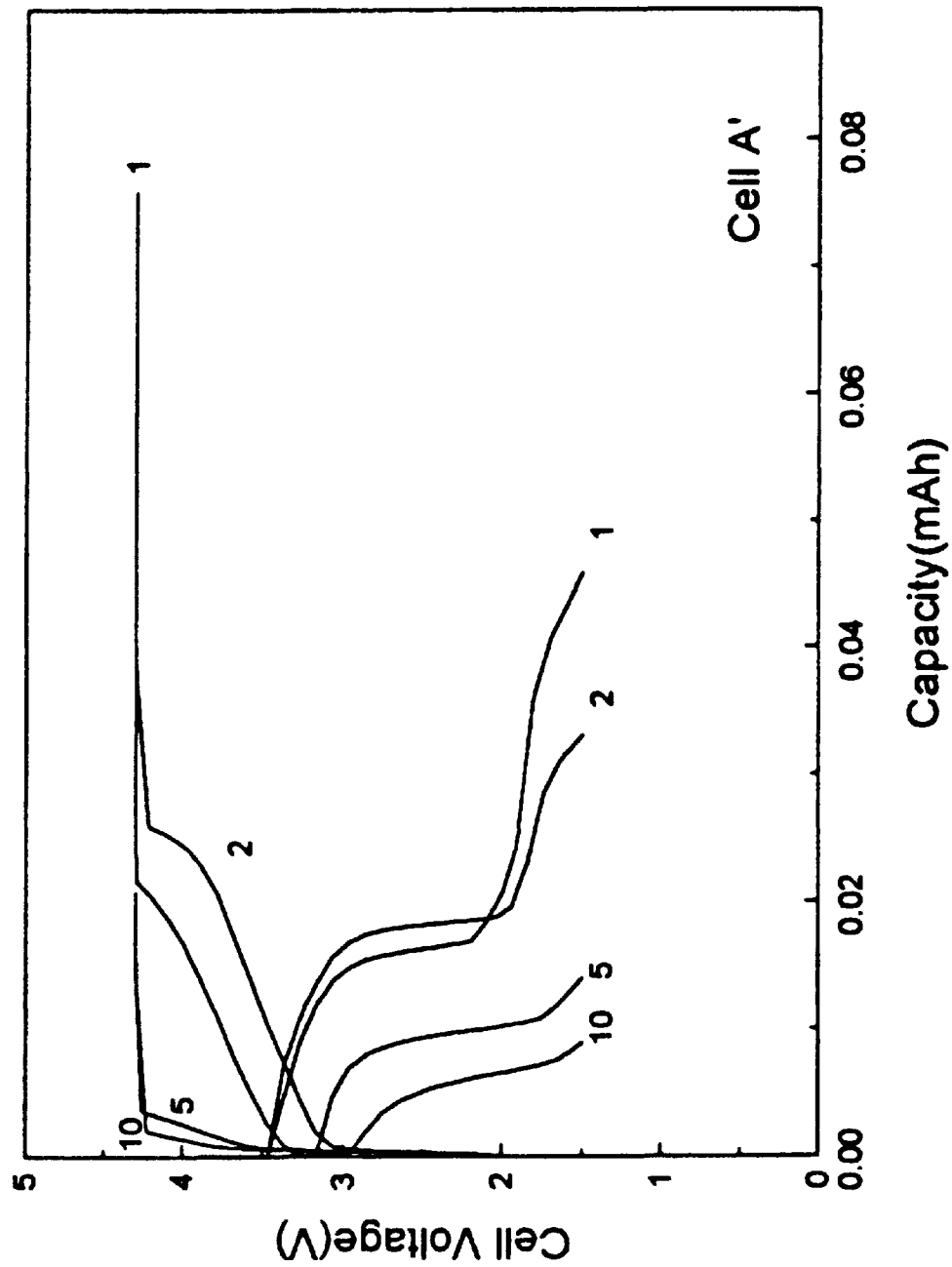
FIG. 5 shows the variation of discharging profile of test cell A' with SUS plate as current collector.
Figure 6:
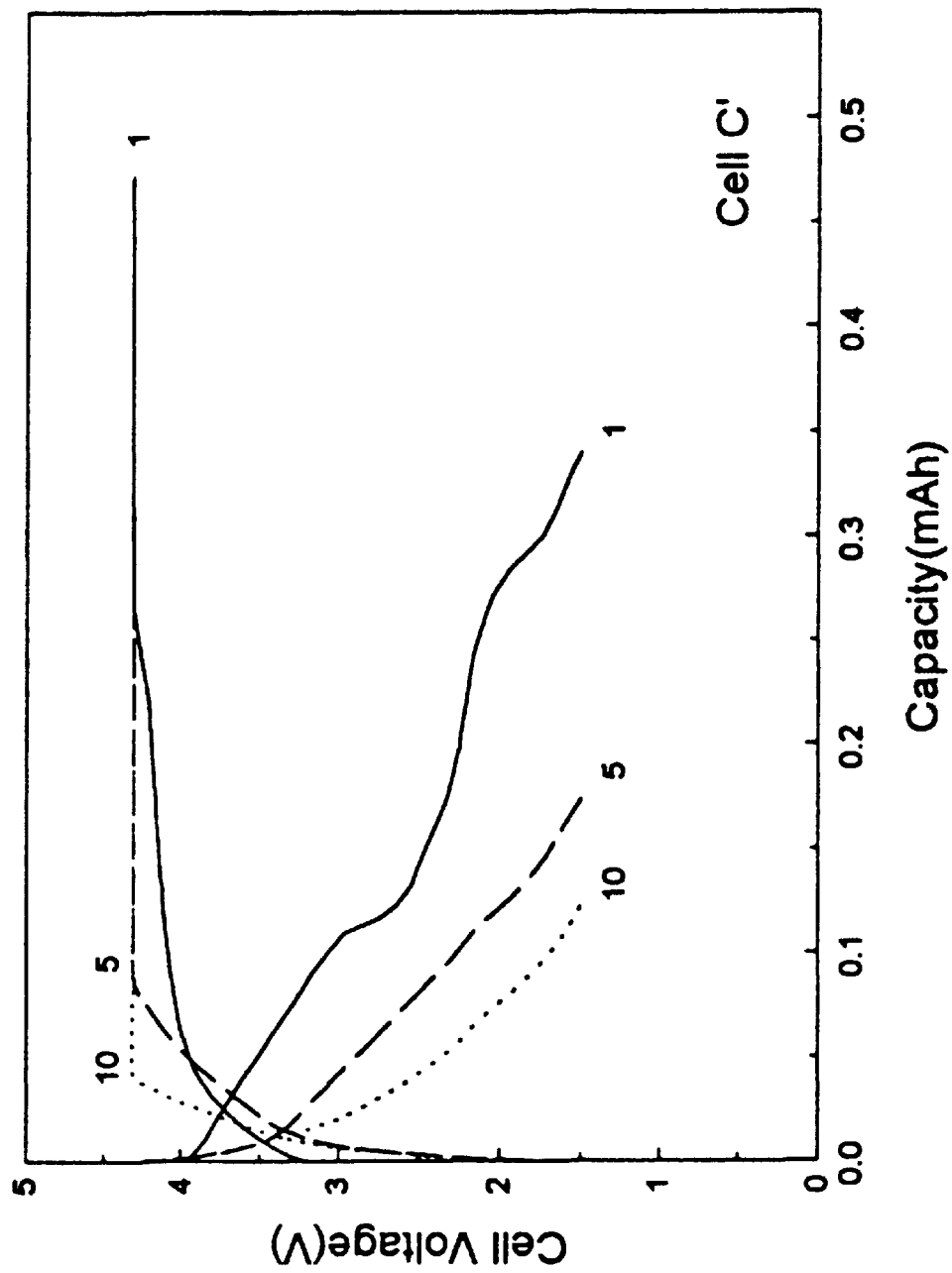
FIG. 6 shows the variation of discharging profile of test cell C' with current collector consisted of graphite.
Figure 7:
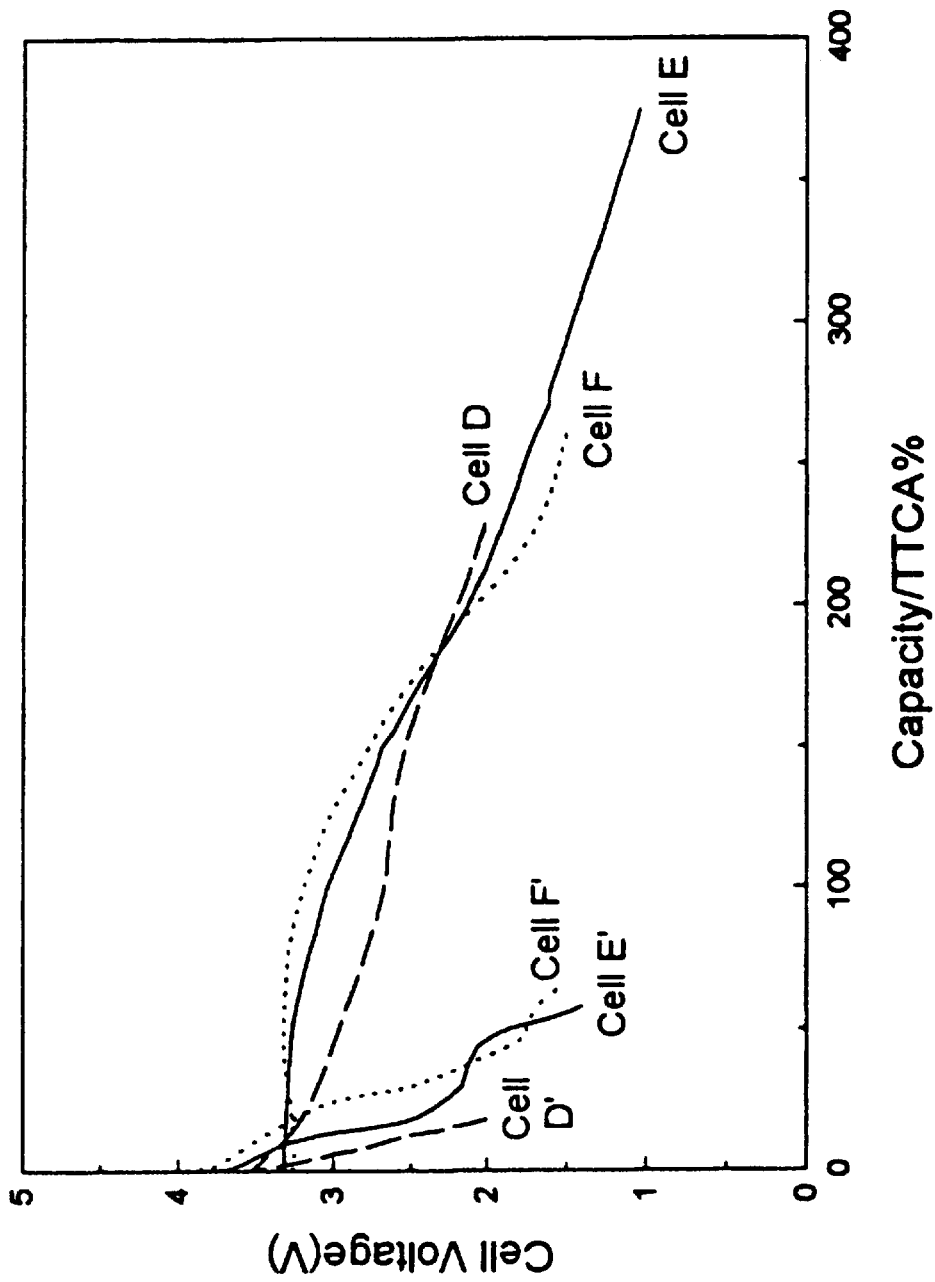
FIG. 7 shows the discharging profiles of test cells D, E, and F which contains molybdenum, chromium, and cobalt, respectively, in positive electrode with copper current collector and compares with the test cells D', E', and F' which have other conductive current collectors.
Figure 8:
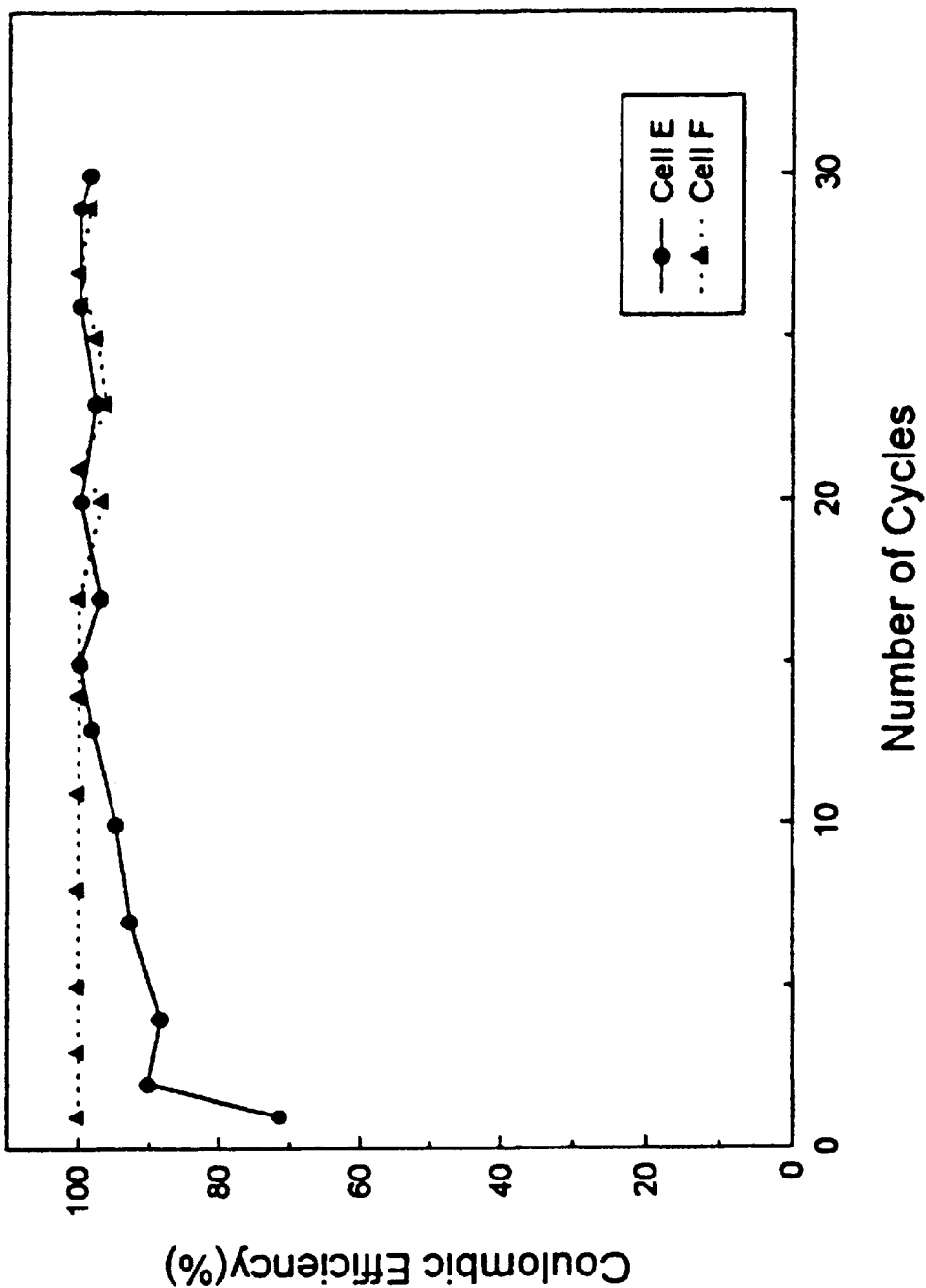
FIG. 8 shows the variations of the charge-discharge efficiency of test cells E and F according to the number of cycle.

Charging and discharging test was galvanostatically carried out using test cells A~G and A'~F'. FIG. 1 demonstrates the discharge profiles of test cell A and C which contains iron and tungsten, respectively, in addition to TTCA. Capacity of test cells A and B is well beyond the capacity of test cell G which contains only TTCA. It indicates that metallic components contained in positive electrode actively participates in electrode reaction and contributes to the capacity of the electrode. FIG. 2 shows the discharge profile of test cell B which does not contain polyaniline in positive electrode and yet exceeds the capacity of organosulfur electrode. FIG. 3 and 4 illustrates the stable cycling behavior of composite electrode containing organosulfur and metal as active components in positive electrode. Charging and discharging profiles are more or less reproducible during 25 cycles. FIG. 5 and 6 shows the charge and discharge profiles of test cell A' and C' which has the same composition of positive electrode material as test cell A and C, but with current collector made of SUS and graphite, respectively, instead of copper metal. Charging potential in both cells rapidly increases and discharging capacity accordingly decreases in the initial cycles. The comparison of FIG. 3 and 4 with FIG. 5 and 6, indicates that the composite positive electrode having current collector made of copper metal provides better stability and consequently ensures higher capacity. Enhanced capacity of the composite positive electrode is further demonstrated in FIG. 7 which shows the discharging profiles of the test cells D, E, and F. Capacities of test cells with the composite electrodes having metallic components such as molybdenum, chromium, and cobalt in addition to TTCA are much higher than what is accounted for by TTCA. Also the enhanced capacity is supported by employing current collector consisted of copper metal when compared with the discharging profiles of test cell D', E' and F' which have other conductive current collectors. FIG. 8 shows the variations of Coulombic efficiencies of test cells E and F. Coulombic efficiencies higher than 80% are maintained until 30 cycles. From the results demonstrated by the above examples, it is clearly shown that the positive electrode prepared following the present invention provides high energy density and good reversibility for secondary battery.

We claim:

1. A positive electrode used for secondary battery comprising;
    1) a positive electrode material comprising;
        i) an organosulfur compound which is capable of forming sulfur—sulfur bond by electrolytic oxidation and reversibly regenerated by reductive cleavage of sulfur—sulfur bond;
        ii) one or more metallic components having multiple oxidation states, which undergoes oxidation when the secondary battery is charged and reduction when the secondary battery is discharged wherein the metallic components are selected from the group consisting of metals of vanadium(V), chromium(Cr), manganese(Mn), iron(Fe), molybdenum(Mo), tungsten(W), cobalt(Co), scandium(Sc), titanium (Ti), nickel(Ni), Zinc(Zn), ruthenium(Ru), and rhodium(Rh) elements, their alloys, and combinations thereof; and
        iii) one or more electrically conductive ingredients selected from the group consisting of conductive carbon and electrically conductive polymer; and
    2) an electrically conductive current collector made of copper or copper alloy on which said positive electrode material is placed.

2. The positive electrode used for secondary battery according to the claim 1, wherein the organosulfur compound comprises one or more thiolate or mercaptan functional groups.

3. The positive electrode used for secondary battery according to the claim 2, wherein the organosulfur compound is selected from the group consisting of 2,5-dimercapto-1,3,4-thiadiazole and trithiocyanuric acid.

4. The positive electrode used for secondary battery according to the claim 1, wherein the metallic components are selected from the group consisting of metals of chromium(Cr), manganese(Mn), iron(Fe), molybdenum (Mo), tungsten(W), and cobalt(Co) elements; their alloys; and combinations thereof.

5. The positive electrode used for secondary battery according to the claim 1, wherein one or more electrically conductive ingredients are selected from the group consisting of graphite, acetylene black, and a conductive polymer having oxygen, nitrogen or sulfur on its repeating unit.

6. The positive electrode used for secondary battery according to the claim 5, wherein a conductive polymer is selected from the group consisting of polyaniline, polythiophene, polypyrrole and their derivatives.

7. An improved secondary battery having high energy density and good reversibility comprising;

i) a positive electrode prepared according to claim 1;

ii) a solid polymer electrolyte having lithium salt; and iii) a negative electrode made of lithium metal, lithium alloy, or lithium intercalation materials selected from the group consisting of graphite, hard carbon, carbon fiber and polyacene.

* * * * *